(No Model.)

J. M. ALLEN & G. W. BEARDEN.
CORN SHELLER.

No. 599,582. Patented Feb. 22, 1898.

Witnesses
W. E. Allen
Victor J. Evans

Joseph M. Allen, Inventors
and George W. Bearden.
By John Wedderburn
Attorney

UNITED STATES PATENT OFFICE.

JOSEPH M. ALLEN AND GEORGE W. BEARDEN, OF CARTECAY, GEORGIA.

CORN-SHELLER.

SPECIFICATION forming part of Letters Patent No. 599,582, dated February 22, 1898.

Application filed June 19, 1897. Serial No. 641,475. (No model.)

*To all whom it may concern:*

Be it known that we, JOSEPH M. ALLEN and GEORGE W. BEARDEN, of Cartecay, in the county of Gilmer and State of Georgia, have invented certain new and useful Improvements in Corn-Shellers; and we do hereby declare the following to be a full, clear, and exact description of the invention, such as will enable others skilled in the art to which it appertains to make and use the same.

This invention relates to improvements in corn-shellers, and has for its purpose to provide a mechanism by means of which the corn may be quickly separated from the cob with comparatively small exertion on the part of the person operating the machine.

Our improved device is of few parts and not likely to get out of order or to be quickly worn out with ordinary use.

Figure 1:
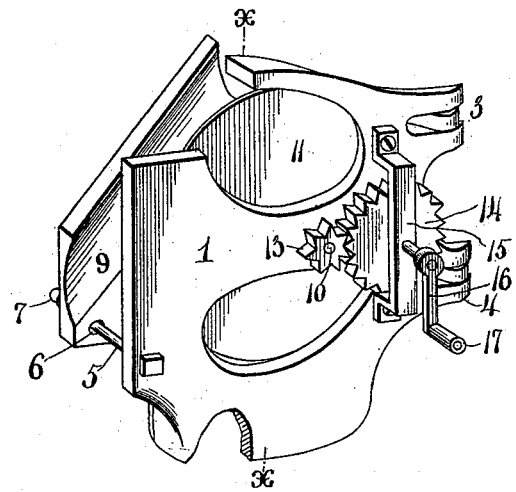
Figures 2, 3:
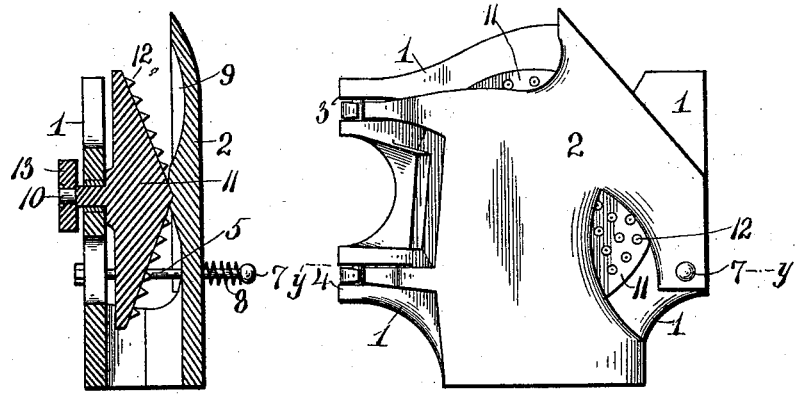
Figure 4:
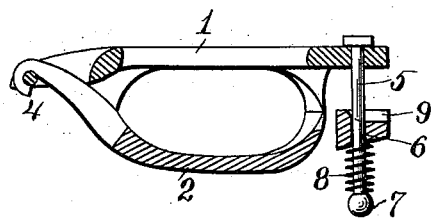

In the drawings herewith, forming part of this specification, Figure 1 is a perspective view of our improved corn-sheller, portions of the casing being broken away. Fig. 2 is a vertical section on the line $x\,x$ of Fig. 1. Fig. 3 is a side elevation of the frame, and Fig. 4 is a section on the line $y\,y$ of Fig. 1.

In the construction of our improved device we provide first a frame consisting of two portions 1 and 2, the said portions at one of their vertical edges being provided with rearwardly-extending lugs 3 and 4, which in conjunction constitute hinges, by means of which the sides 1 and 2 may be radially distended from each other. The opposite edges of the portions 1 and 2 are provided with a fastening-bar 5, one end of which is firmly secured in the frame portion 1, the other end being projected through a slot 6 in the opposite portion 2, the upper portion of said slot being of enlarged size. The said bar 5 is provided upon its free end with a knob 7, and between said knob and bearing against the same and the outer surface of the frame portion 2 we provide on said bar 5 a spiral spring 8, so that the portions 1 and 2 may be in this manner held in resilient engagement with each other.

The inner surfaces of the frame portions 1 and 2, near the top thereof, are concave, so as to form an opening into which the ears of corn may be deposited, and in the frame portion 2, below said concave portion, we provide a chute 9, by means of which after the grain has been removed from the cob the latter will be dropped through said chute.

Upon the frame portion 1 we provide the operative mechanism, consisting of a shaft 10, journaled to said portion 2 and having rigidly mounted upon its inner end a plano-convex disk 11, the convex portion facing inwardly and provided with a plurality of inwardly-directed teeth 12 for shelling the corn. In lieu of said teeth, however, we may provide serrations in said convex surface. The said shaft 10 is suitably journaled in said portion 1 of the frame, and upon its outer end we provide a gear-pinion 13, rigidly secured thereto. Adjacent to said gear-pinion 13 we provide a gear-wheel 14, the spindle thereof being suitably journaled in the side portion 1 and in a keeper 15, secured in a suitable manner upon the vertical wall of said side portion of the frame. Upon the outer projected end of said spindle we provide a suitable crank 16, rigidly secured thereto, and a handle 17 for operating said crank and said handle may, if desired, be provided with a rotatable sleeve to facilitate the operation of the crank.

The operation of our device is as follows: The ears of corn, being deposited in the receptacle formed by the registering concave inner surfaces of the sides of the frame, are successively brought into contact with the teeth upon the disk 11, the said disk being then rotated by means of the engagement of the gear-wheel 14 with the gear-pinion 13, the said wheel 14 being actuated by the crank 16. The corn, being thus separated from the cob, will drop directly downward through the machine, while the cob from which it has been separated will be dropped through the chute 9.

The object of hinging the two side portions 1 and 2 together is for the purpose of gaining access at any time to the disk 11, so that the teeth or serrations thereon may be sharpened with a file or otherwise, and also for the purpose of cleaning said disk. The object of retaining said sides resiliently together is for the purpose of affording elastic pressure of the ears of corn against the disk 11, as by so doing the ears will have a greater tendency to rotate or otherwise change their position, so that all the grains will be scraped therefrom.

As herein shown, our corn-sheller is not provided with a balance or momentum wheel, as we do not deem the same a necessary feature; but, if preferred, such a momentum-wheel may be secured upon the spindle supporting the gear-wheel 14 in a position outside of the keeper 15.

The corn-sheller is to be attached to a box or case by clamps, each clamp being provided with bolts having their heads inserted in the frame 1. It will be noted that in operation the cob goes nearly through the chute 9 and is then reversed and carried by the disk to a point immediately below the spiral spring and falls on the outside of the case, while the corn is retained therein.

Having thus described our device, what we claim as new, and desire to secure by Letters Patent, is—

1. In a corn-sheller, a frame composed of two parts 1, 2, the part 1 being substantially flat on one face and provided on one edge with outwardly-extending lugs, and having its lower portion curved to form half of a discharge-spout, said part being cut away above and below said center and the part 2 substantially flat on one face and provided on the other side with a groove into which the ears of corn are fed, and having its lower portion curved to form one-half of a discharge-spout, said part being provided with hooked projections on one edge engaging with the lugs on the other part to form hinges, and means for yieldingly fastening the two parts of the frame together, substantially as described.

2. In a corn-sheller, a frame composed of two parts 1, 2, the part 1 being substantially flat on one face and provided on one edge with outwardly-extending lugs, and having its lower portion curved to form half of a discharge-spout, said part being cut away above and below said center and the part 2 substantially flat on one face and provided on the other side with a groove into which the ears of corn are fed, and having its lower portion curved to form one-half of a discharge-spout, said part being provided with hooked projections on one edge engaging with the lugs on the other part to form hinges, a toothed disk mounted between said parts of the frame, means for rotating said disk, and means for fastening the two parts of the frame together, substantially as described.

In testimony whereof we have signed this specification in the presence of two subscribing witnesses.

JOSEPH M. ALLEN.
GEORGE W. BEARDEN.

Witnesses:
R. W. HOLDEN,
N. C. GOSS.